3 Sheets—Sheet 1.

J. PEPPER.

KNITTING MACHINE.

No. 3,901. Reissued Mar. 29, 1870.

J. PEPPER.

KNITTING MACHINE.

No. 3,901. Reissued Mar. 29, 1870.

J. PEPPER.
KNITTING MACHINE.
No. 3,901. Reissued Mar. 29, 1870.
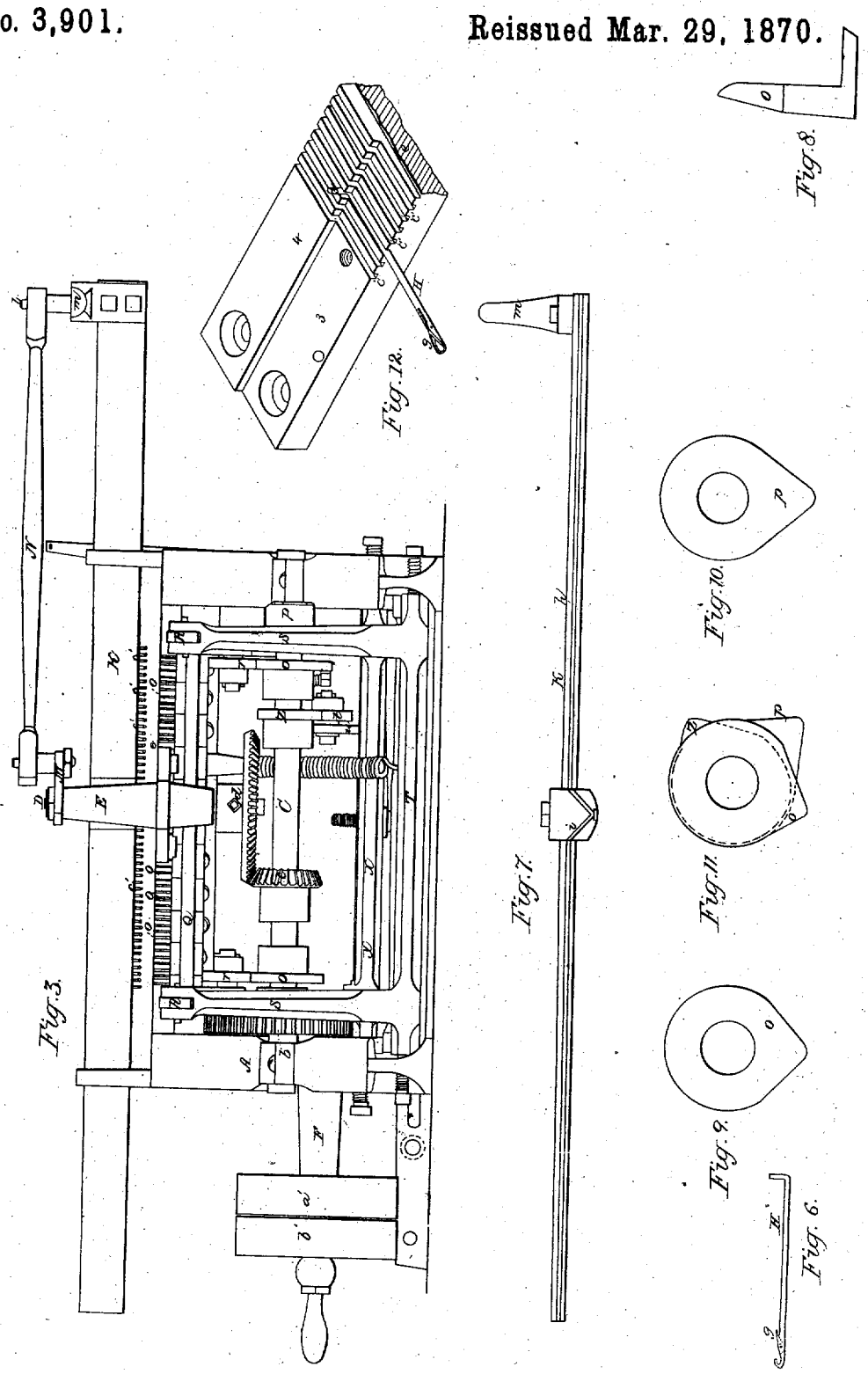

UNITED STATES PATENT OFFICE.

THE PEPPER KNITTING MACHINE COMPANY, OF BOSTON, MASSACHUSETTS, ASSIGNEE, BY MESNE ASSIGNMENTS, OF JOHN PEPPER.

IMPROVEMENT IN KNITTING-MACHINES.

Specification forming part of Letters Patent No. 13,289, dated July 17, 1855; Reissue No. 1,538, dated September 15, 1863; extended seven years; Reissue No. 3,901, dated March 29, 1870.

*To all whom it may concern:*

Be it known that JOHN PEPPER, formerly of Holderness, in the county of Grafton, and now residing at Lake Village, in the county of Belknap, and State of New Hampshire, did invent certain new and useful Improvements in Machines for Knitting either Plain or Ribbed Fabrics; and I do hereby declare that the following is a full, clear, and exact description of the same, reference being had to the accompanying drawings, making a part of this specification, in which—

Figure 1:
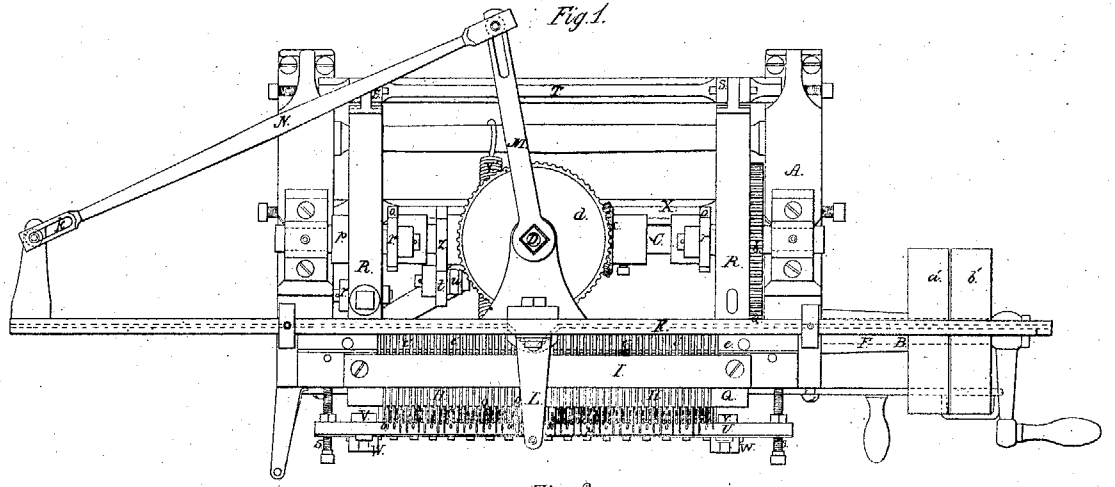
Figure 2:
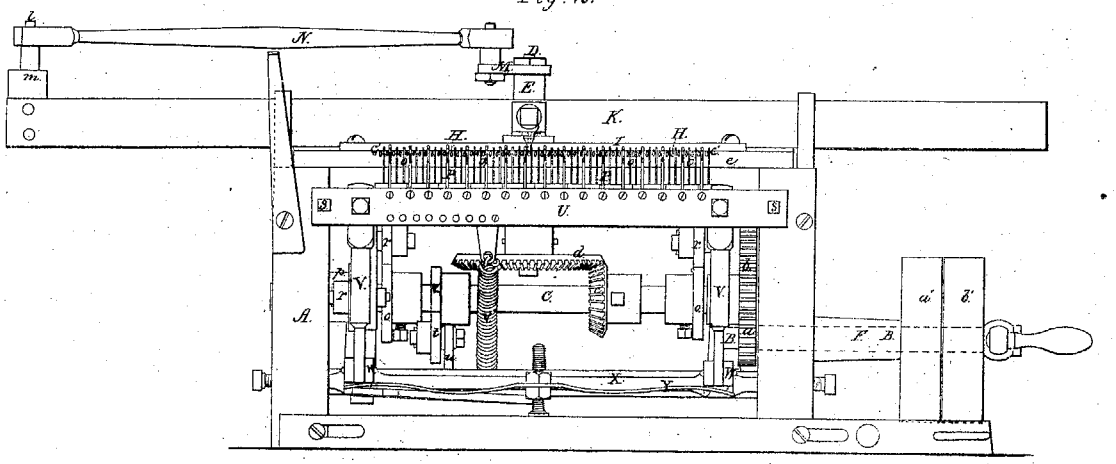
Figure 5:
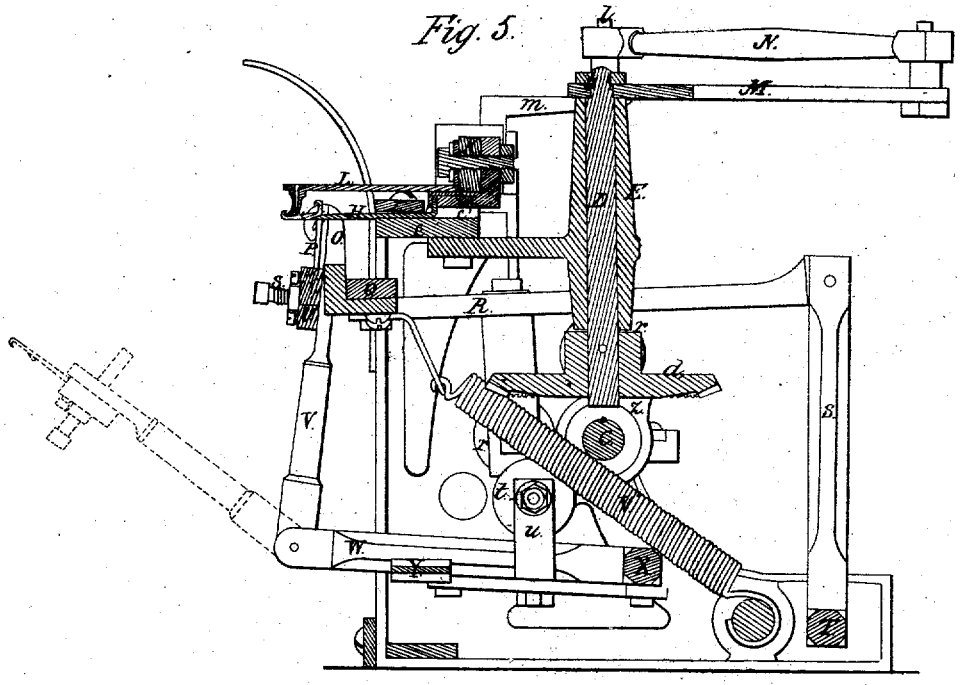
Figure 4:
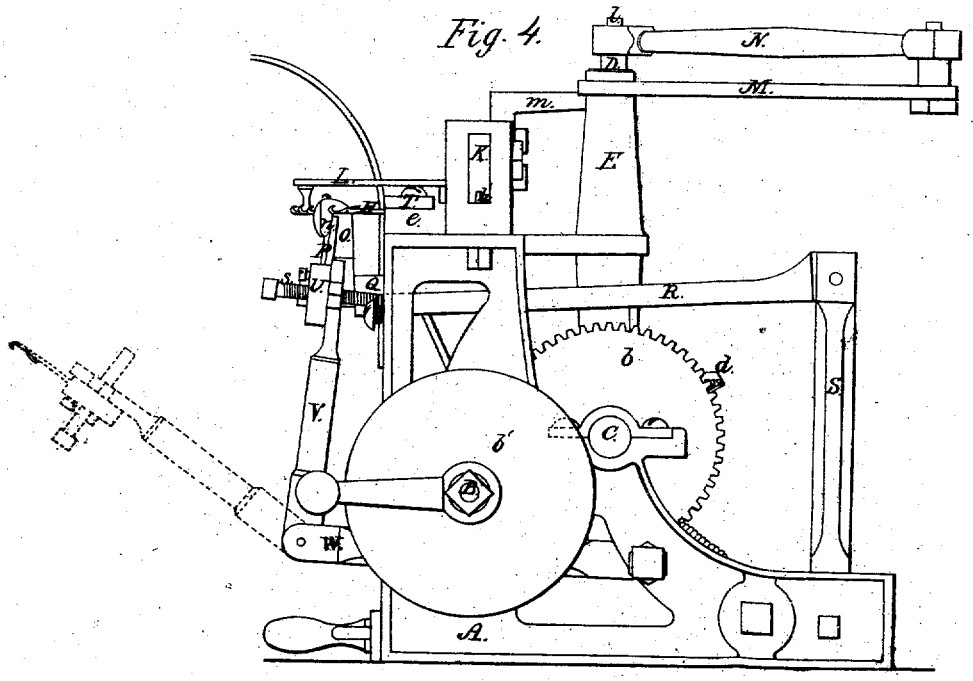

Figure 1 represents a top view of the machine. Fig. 2 represents a front elevation of the same. Fig. 3 represents a rear elevation of the machine. Fig. 4 represents an end view of the machine, so taken as to exhibit that end at which the driving-pulley is situated. Fig. 5 represents a vertical transverse section taken through the upright crank-shaft, to be hereinafter described. Figs. 6, 7, 8, 9, 10, 11, and 12 represent details of the machine, which will be referred to hereinafter.

Similar letters of reference, where they occur in the several separate figures, denote like parts in all the drawings.

This invention relates, first, to the combination of a knitting-machine needle, having a portion of the same wire that forms its shank bent up at an angle thereto, with a grooved needle-bed, having the grooved portion in which the bent-up part of the needle works elevated above or deeper than that portion in which the rest of the needle works, such bent-up portion serving as the means to which the power required to drive the needle forward and back is applied, and, in connection with the peculiarly constructed needle-bed, as an efficient guide to prevent the needle from rolling, and to preserve the hook and latch upright or in a proper working position; and the invention relates, secondly, to the socket or guide in which the needles work; and the invention relates, thirdly, to the construction of the sinkers and their combination with the needles and other co-operative parts for forming ribbed and plain work, as may be desired, and as will be explained.

In the accompanying drawings, A represents the frame of a knitting-machine, it being constructed so as to carry and support a driving-shaft, B, a cam-shaft, C, and a vertical crank-shaft, D, which moves within an upright tube, E, arranged as therein seen. The driving-shaft B is shown in Figs. 1 and 2 as operating through the tube F, being therein seen in dotted lines. It carries a fast and loose pulley, *a' b'*, upon its outer end, while upon its inner end there is attached a pinion-gear, *a*, which engages with a large gear, *b*, fixed upon the cam-shaft C. The two shafts C and D have upon them engaging bevel-gears *c d* for the purpose of communicating motion from one to the other of them.

The top bar, *e*, of the frame of the machine is stationary, and provided with a series of transverse grooves, *c' c' c'*, for the reception of the needles H H H, said needles being arranged therein horizontally, and so that each can be capable of sliding longitudinally in one of the said grooves. The needles, when arranged in the grooves, are kept in place by a cap-bar, I, which extends ever them and is secured to the top bar, *e*, by screws, as seen in Figs. 1 and 2. These needles are made of a single piece of wire, of nearly straight form, and a part of the shank of the needle, back of the hook and latch, is bent at an angle to the axis of the needle, so as to form a projection on said shank or wire, as seen in Figs. 5 and 6, the latter figure being a side view of one of said needles, with the bent portion or projection at its rear end. This form and construction of needle is simple and cheap, while it is so compact in form as to require but little space, and be easily moved out and in—an important feature when it is remembered that these needles are used in a multiple capacity, must lie in very close proximity to each other, maintain their proper working position, and be capable of being moved with ease, certainty, and very great rapidity, without liability of being broken or injured or sprung out of proper working position.

To the hook of each needle there is applied a self-acting closing-fly, *g*, it being a device well known and in common use. The object in bending the rear part of the shank of the needle at an angle to the axis of the needle, as described and shown, is to enable such part to enter and work in the groove *h* of a sliding bar, K, an under side view of which is represented in Fig. 7.

The bar *e* is constructed with its rear thicker than its forward portion, 3, or elevated above it, as shown in Fig. 12, the upright or bent portion 5 of the needles H traversing in the thicker portion 4 of the said bar, and thus the needles are prevented from rolling in their groove or guide, and maintain the hook or latch in its upright or proper working position. The groove or guide, moreover, prevents the needle from bending or springing when the power to move it is applied to the swell upon its shank. The bent portion of the needle-shank being in a plane slightly above the plane of the plate, groove, or guide in which it moves admits of the driving-plate K being placed close to and immediately over the needle-shank, thus making these parts very compact, and occupying but little space.

The bar K supports the yarn-guide L, and is arranged above the needles, as seen in Figs. 1, 2 and 5, and is made to slide freely in a longitudinal direction, so as to carry the yarn-guide L across the series of needles. In the rear of and below the yarn-guide L the groove *h* in the bar K is made of a V or angular form, as seen at *i* in Fig. 7, the object of this angular groove being to impart to each needle a forward and backward movement, in order to enable it not only to seize the yarn, but to move its fly *g* forward beyond the stitch on the shank of the needle, the power to so move or drive the needles being applied through the grooved plate or bar K to the swell 5 directly upon the shank of the needle, said swell or bent portion entering the groove in said bar and moved by it. The sliding bar K has an intermittent reciprocating longitudinal movement imparted to it through or by means of a crank, M, and a slotted connecting-rod, N. The crank M projects horizontally from the upper part of the shaft D, one end of the connecting-rod being joined to the outer end of said crank. A slot, *k*, is formed in or through the connecting-rod, as seen in Fig. 1, and made to receive a pin, *l*, extending upward from an arm, *m*, projecting from the sliding bar K. The object of the slot in the connecting bar is to enable the bar K to be temporarily stopped in its movement while the sinkers are performing their motions.

In connection with the needles I employ a series of sinkers, O O O, Figs. 1, 2, and 5. Each of these sinkers, with the exception of those which are termed "cast-off" sinkers, and lie directly back of or behind the rib-needles P P P, is formed with a hook, as seen at *n*, Fig. 4, while each remaining or cast-off sinker is constructed without any such hook, or takes the form as shown in side view in Fig. 8. The several sinkers are affixed to a horizontal bar, Q, whose ends are attached to two bars, R R, which are respectively jointed to the upper ends of two upright arms, S S, projecting from a rocking shaft, T, as seen in the drawings. The sinker-bar Q has an upward and a forward motion imparted to it at suitable times, the upward motion being for the purpose of casting off the loops formed upon the front portions of the hooks of the sinkers. The forward motion of the sinkers is for casting the loops over the heads or hooks of the horizontal needles. These movements are produced by two sets of cams, *o p*, which are fixed upon the cam-shaft, as seen in the drawings, and are respectively made to operate against friction-rollers *r r r*, applied to the sides of the projections from the bars R R.

Fig. 9 is a side view of one of the cams *o*, their relative position on the shaft being exhibited in Fig. 11.

In connection with the series of needles hereinbefore described, I apply a set of ribbing-needles, P P P, which project upward from a horizontal bar, U. They are made to work between the sinkers, and each of them is disposed directly in front of some one of the cast-off sinkers, which are made without any hook, as hereinbefore explained. The bar U is provided at its two extremities with adjusting stop-screws *s s*, whose inner ends abut against the framework, as seen in Figs. 1 and 2. The object of these screws is to adjust the ribbing-needles, so as to vary the length of the rib-loops as circumstances may require. The rib-needle bar is mounted upon posts V V, whose lower ends are hinged or jointed to arms W W, projecting horizontally, or thereabout, from a rocker-shaft, X, arranged as seen in the drawings. The said arms W W rest upon a steel spring, Y, by which they are elevated at a proper time, they being depressed by means of a cam, Z, fixed upon the cam-shaft C and made to work against a roller, *t*, carried by a post or arm, *u*, extending from the rocker-shaft X. In Fig. 11 this cam and its relative position to the other cams are exhibited. The forward motion of the rib needle-bar is effected by the forward movement and pressure of the sinker-bar Q, while the rearward movement of it is produced by the back draft of the sinker-bar on the work on the ribbing-needles, such sinker-bar being carried backward by a spring, V′, as seen in the drawings.

Having thus described the construction of the machine, I would remark that it is adapted to knitting either plain or ribbed work, as occasion may require. When plain work is being made by it the ribbing-needles and their supporting-bar are turned downward into the position exhibited by dotted lines in Figs. 4 and 5.

The operation of the machine may be thus described: The yarn-guide, carrying the yarn, is first moved over the needles during and by the movement of the bar K. This operation lays the yarn in the hooks of the plain and ribbing needles and around the front ends of the hooked sinkers. Next the sinkers rise up so as to cast off the yarn from the front parts of the hooks of those which are hooked, the ribbing-needles at the same time being made to move downward, so as to draw their loops through those that previously may have been formed on their shanks. Next the sinker-bar is moved forward, so as to cast the stitches on the shanks of the plain-needles over those in the hooks thereof. Next the sinker-bar is moved downward and catches the work in the throats of the sinkers and draws it downward, so as to carry the loops of the ribbing-needles entirely below their flies. Thus the several perations required in the formation of rib-work are successively carried on. In the performance of plain work the operation of the horizontal or plain needles and those of the sinkers are essentially as hereinbefore described, the ribbing-needles being moved out of the way or turned downward, as hereinbefore mentioned. The shank of each of the sinkers that is made without a hook performs the same function in moving the work forward as does each of the shanks of the hooked sinkers. It does not perform any other function; or, in other words, it does not aid in the formation of loops or receive yarn from the yarn-guide, as do the hooks of the hooked sinkers. I therefore term each of the sinkers constructed without a hook a "cast-off" sinker, in order to distinguish it from the hooked or loop-forming sinkers.

Having thus fully described the invention, what is claimed therein as new, and desired to be secured by Letters Patent, is—

1. A knitting-machine needle made substantially straight in form and having a portion of its shank in the plane of its length bent off laterally at an angle thereto, when combined with a grooved needle-bed having the grooved portion in which the bent part of the needle works elevated above or deeper than that portion in which the rest of the needle works, so as to form an efficient guide to the same, to prevent the needle from rolling and to maintain the hook and latch in proper working position, and said bent portion of the needle also serving as the means to which power may be applied to move the needle back and forth without undue bending or springing, substantially as described.

2. The bar *e*, with its grooves *e'*, having its rear elevated above its forward portion, for the purpose of preventing the needle from rolling therein, substantially as described.

3. In combination with the hooked sinkers and ribbing-needles, made to operate substantially as described, the series of cast-off sinkers, or those formed without hooks, the same being arranged in the sinker-bar, and not only so as to admit the ribbing-needles to work between the hooked sinkers, but so as to render the machine capable of performing either plain or ribbed work, as specified.

4. The rib-needles, constructed substantially as described, to take the place of the front or hook of the sinker in forming the loop for the ribbed stitch.

THE PEPPER KNITTING MACHINE COMPANY,
By HENRY HASTINGS,
*Their President.*

Witnesses:
CHAS. F. WALCOTT,
DAN. A. GLEASON.